3,020,458
SERVOSYSTEM ELECTRO-MECHANICAL
RESET MECHANISM
Walter A. Morgan, Baytown, Tex., assignor, by mesne assignments, to Esso Research and Engineering Company, Elizabeth, N.J., a corporation of Delaware
Filed Nov. 16, 1960, Ser. No. 69,608
2 Claims. (Cl. 318—28)

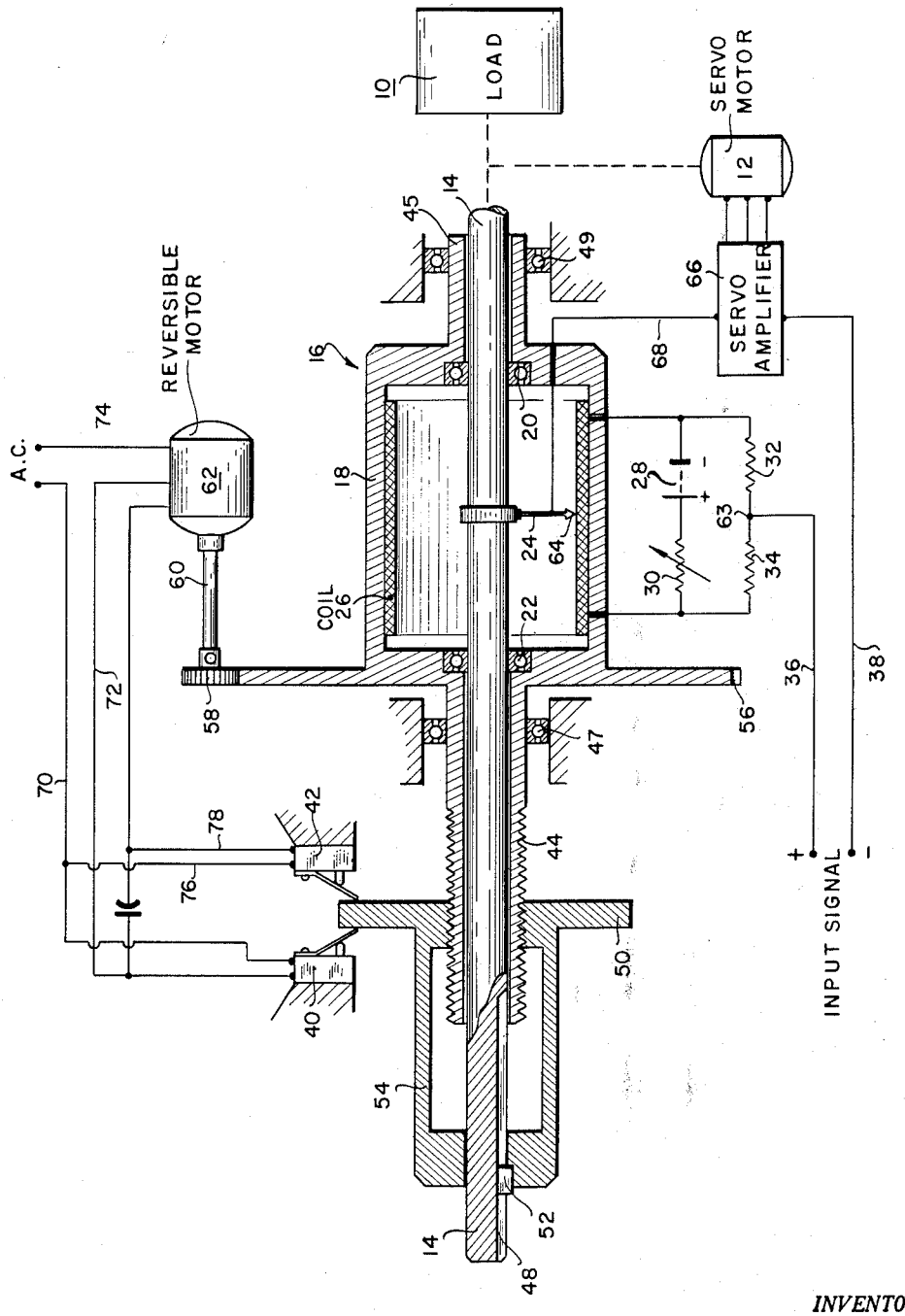

This invention is an electro-mechanical reset mechanism for use with proportional control systems used for controlling the linear position or angular rotation of a load.

Conventional proportional control systems have one serious limitation—the necessity of an input signal in order to maintain a given load condition. The input signal is the difference between the predetermined signal (set point signal) and the signal developed by an appropriate sensing element; hence, this difference represents the error between the actual magnitude of a desired parameter and what we would like this magnitude to be. The difference between the actual magnitude of a desired parameter and what we would like this magnitude to be is called the steady state error or "offset." In order to eliminate this steady state error or "offset," some form of reset action is commonly added to proportional controllers. In conventional electrical controllers, the reset action has usually been incorporated into the servo amplifier circuitry. Although this practice has merit, it requires a special servo amplifier and does not permit the range of reset rates obtainable with the new electro-mechanical reset mechanism to be described herein.

The invention may be understood by reference to the following detailed description and single drawing which is a schematic view illustrating one preferred method of carrying out the invention.

Referring to the drawing, a proportional control system is shown which is used for controlling the linear position or angular rotation of a load 10 in response to an input signal. The output shaft of the servo motor 12 is connected to the load 10 either directly or through a gear train. The load shaft is in turn connected to the shaft 14 of a potentiometer 16.

The potentiometer shaft 14 is mounted within the housing 18 of potentiometer 16 by means such as roller bearings 20 and 22. A wiper contact 24 is mounted for rotation with the shaft 14.

A servo motor control voltage is obtained through the wiper contact 24 from the potentiometer resistance winding 26. The resistance winding 26 is arranged in parallel with a series arrangement of a battery 28 and adjusting resistor 30 and also in parallel with a series arrangement of resistors 32 and 34.

The battery 28 is arranged in the circuit in such a manner that its E.M.F. is in opposition to the input signal across lines 36 and 38. An input signal will cause the servo motor 12 to drive the load 10 and the shaft 14 of potentiometer 16 until the voltage at the wiper 24 is equal to the input signal. Since the voltage developed by the proportional potentiometer is linear with wiper position, it follows that the load position will bear a linear proportional relationship to the input signal.

As formerly stated, the input signal is usually the difference between the required set point signal and the signal developed by an appropriate sensing element. In order to obtain accurate control of the load, the difference between the actual magnitude of the input signal and the desired magnitude should be very small. Therefore, some form of reset action must be used to eliminate this "offset" error.

The electro-mechanical offset mechanism includes a pair of spaced-apart normally open switches 40 and 42 having an overtravel provision. The potentiometer housing 18 is provided with an external threaded boss 44. A second external boss 45 extends from housing 18 on the side opposite from threaded boss 44. Bearings 47 and 49 are mounted about boss 44 and boss 45, respectively, so that the housing 18 can also be rotated. A keyway 48 is provided in the shaft 14.

An annular cam 50 having an internal threaded portion adapted to mate with the external threads on the boss 44 is mounted for axial movement in response to rotation of the shaft 14 by means of a key member 52 in the cylindrical cam support 54 and engaging the keyway 48 on the rotatable shaft 14. Thus, when shaft 14 rotates, the annular cam 50 rotates with the shaft 14 and moves axially along the boss 44.

The housing 18 of the potentiometer 16 is provided with a large external gear 56, which meshes with a spur gear 58 on the shaft 60 of a two-phase reversible motor 62. Rotation of the shaft 60 of motor 62 causes the housing 18 of potentiometer 16 to rotate about its central shaft 14.

The function of the reset mechanism is to rotate the housing 18 of the potentiometer 16 relative to the shaft 14 in such a direction that the voltage developed between terminals 63 and 64 of the proportional circuit will become zero. When this condition has been reached, the input signal through the servo amplifier 66 across lines 68 and 38 is zero indicating that the actual magnitude of the measured parameter is exactly equal to the desired magnitude of the parameter—i.e., no "offset."

In operation, the cam 50 is positioned relative to the shaft 14 such that when the wiper 24 of the potentiometer 16 is at midscale, both switches 40 and 42 are open. Rotation of the shaft 14 in either direction from this point will close one of the two switches.

When a sudden input signal is fed across lines 36 and 38, the load 10 is rotated or displaced until the voltage between terminals 63 and 64 on the proportional band circuit is just equal to the input signal. Now as the load shaft 14 began to move, the cam 50 contacted one of the two switches 40 or 42 to complete a circuit to the motor 62 and causing the output shaft 60 to rotate in a direction determined by the particular switch 40 or 42 which was energized. The motor 62 rotates the housing 18 of the potentiometer in such a direction that the voltage between points 63 and 64 is minimized.

If switch 40 is closed by the cam 50, a circuit is completed through line 70, switch 40, and line 72 through the motor 62 and line 74 to actuate the motor to rotate the shaft 60 in one direction. If the cam 50 is moved to close switch 42, a circuit is completed through line 70, line 76, switch 42, and line 78, through motor 62 and line 74, to rotate the shaft 60 in the other direction.

As the reset action takes place, the shaft in the load 10 continues to be actuated by the servo motor 12 so that at all times the sum of the input signal across lines 36 and 38 and the voltage tapped from resistor 26 by means of wiper 24 is zero. Now assuming a stable system (one in which zero input signal can be obtained with a load position in the range of the regulator), the combined signal will eventually arrive at a load position which will result in a zero input signal to the servo amplifier 66. In this position, the switches 40 and 42 are both returned to their normally open position and the motor 62 is deenergized.

Although the examples have shown rotary loads and rotary potentiometers, loads requiring linear motion can be adapted to this system by: (1) converting the rotary output from the servo motor to linear motion by means of a rack and pinion, (2) replacing the rotary potentiometer with a linear potentiometer, and (3) by modifying the reset action drive so that instead of providing rotary reset action, it provides linear reset action.

I claim:

1. A reset system for use with a servo-mechanism including a servo amplifier and servo motor for controlling the position of a load comprising: a potentiometer having a movable shaft extending into the housing thereof; a wiper contact on said movable shaft; a pair of spaced-apart normally open switches; at least one cam located between said normally open switches when the wiper contact is at the midscale point of the potentiometer and movable in response to a predetermined amount of movement of the movable shaft to actuate a predetermined one of said switches; a reversible motor actuated by the closing of the switch; and means interconnecting the motor and the housing of the potentiometer for moving the housing in the appropriate direction to reset the system.

2. A reset mechanism in accordance with claim 1 wherein the shaft is a rotatable shaft, the cam is movable axially with respect to the shaft, and the means interconnecting the motor and the housing of the potentiometer for moving the housing in the appropriate direction to reset the system consists of a gear connected to the motor shaft which meshes with a gear on the potentiometer housing.

No references cited.